United States Patent [19]

Rudavicius

[11] Patent Number: 4,715,434
[45] Date of Patent: Dec. 29, 1987

[54] FLUID TREATMENT PRESSURE VESSEL WITH A DISPOSABLE CARTRIDGE AND VALVE THEREFOR

[75] Inventor: Gabriel J. Rudavicius, Lemont, Ill.

[73] Assignee: Navistar International Transportation Corp., Chicago, Ill.

[21] Appl. No.: 810,943

[22] Filed: Dec. 19, 1985

[51] Int. Cl.$^4$ .............................................. F28F 13/12
[52] U.S. Cl. ...................................... 165/119; 165/916
[58] Field of Search .................. 165/119, 916; 251/317

[56] References Cited

U.S. PATENT DOCUMENTS

| | | | |
|---|---|---|---|
| 2,858,098 | 10/1958 | Sanctuary | 251/317 X |
| 3,726,262 | 4/1973 | Moon | 165/119 X |
| 3,830,289 | 8/1974 | Olson | 165/119 X |
| 4,113,228 | 9/1978 | Frye | 251/317 X |
| 4,387,764 | 6/1983 | Lister | 165/119 |

OTHER PUBLICATIONS

Cummins Engine Co., L10 Design Features, 9-82.

*Primary Examiner*—Albert W. Davis, Jr.
*Assistant Examiner*—Richard R. Cole
*Attorney, Agent, or Firm*—F. David AuBuchon; Dennis K. Sullivan

[57] ABSTRACT

The present invention provides an inventive fluid filter-treatment pressure vessel and valve arrangement which allows the fluid filter to be readily isolated from the coolant system. The present invention utilizes a single spool to close off both the inlet and outlet to the fluid filter in a virtually leak proof fashion while not requiring precision machine parts.

1 Claim, 5 Drawing Figures

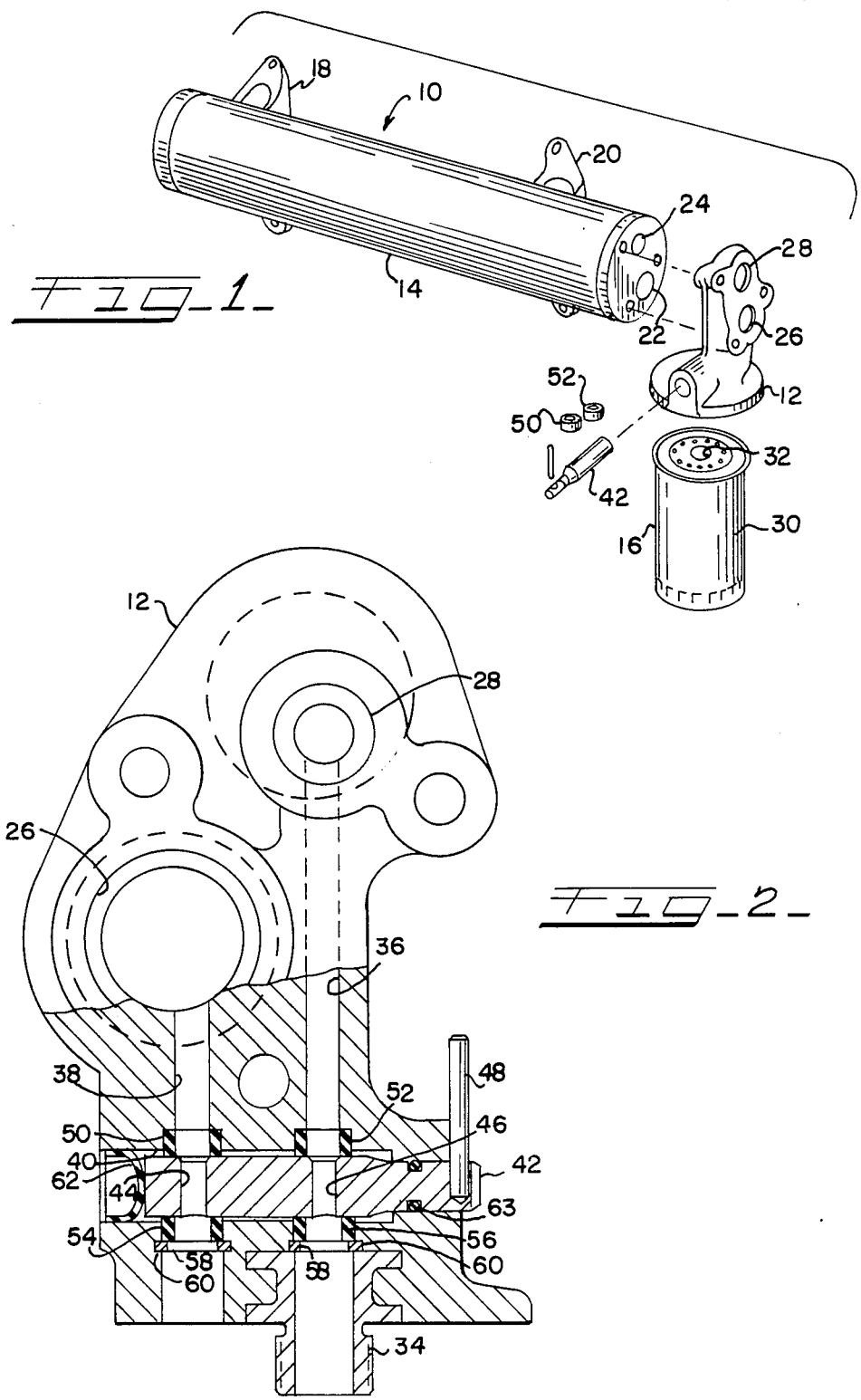

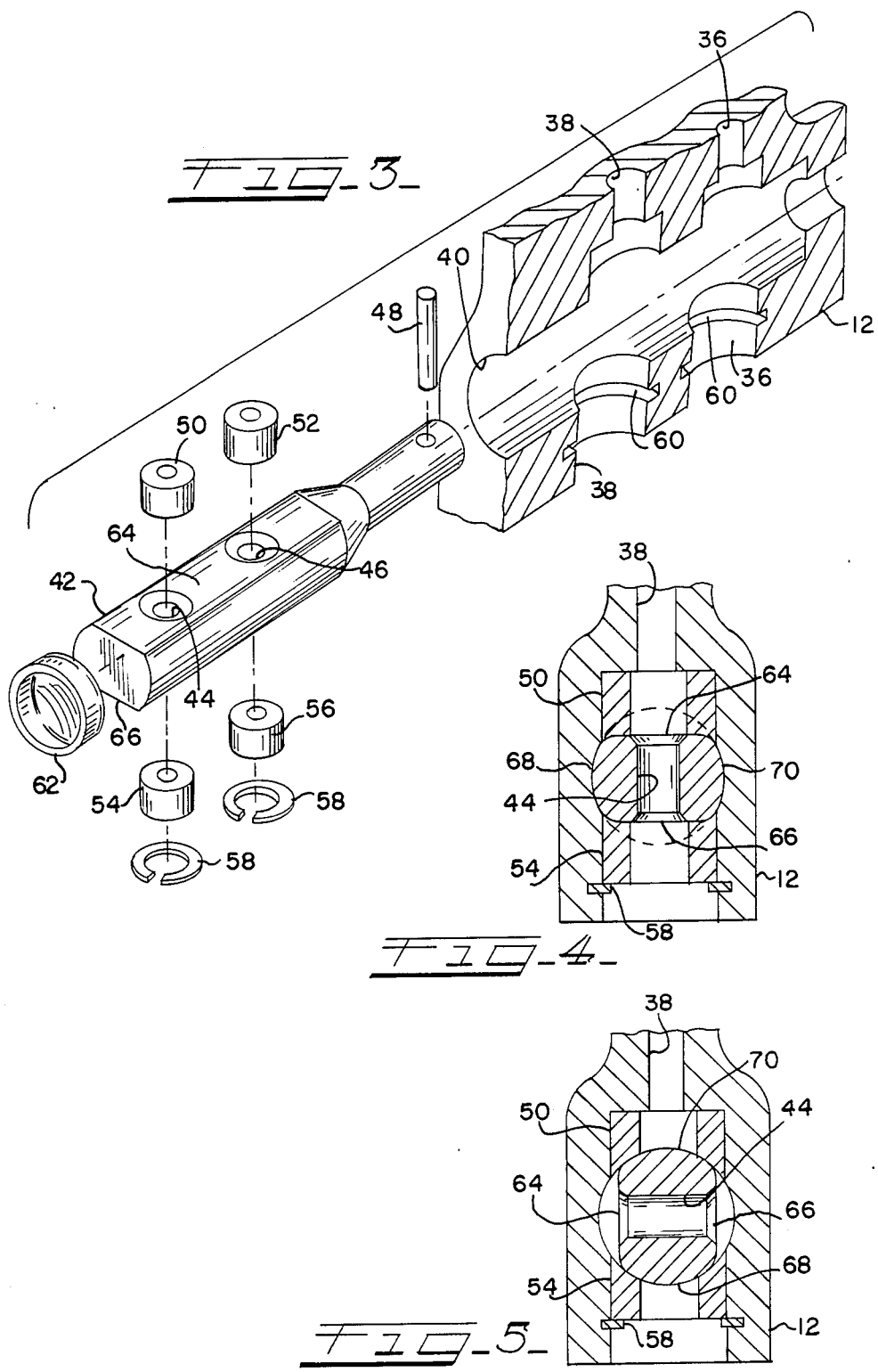

FLUID TREATMENT PRESSURE VESSEL WITH A DISPOSABLE CARTRIDGE AND VALVE THEREFOR

FIELD OF THE INVENTION

The field of the present invention is that of fluid treatment pressure vessels with removable cartridge fluid treatment elements. More particularly, the present invention relates to motor vehicle internal combustion engine coolant filter and treatment systems and a novel valve arrangement therefor.

DISCLOSURE STATEMENT

Internal combustion engines typically have liquid coolant systems. It is also been known to include in such coolant systems a filter to remove impurities from the coolant system. The filter cartridge can also be utilized for releasing chemical solvents into the coolant system. The chemical solvents aid in the prevention of corrosion within the engine and radiator.

It is sometimes desirable to isolate the coolant filter from the remainder of the coolant system. During the production of the engine, the coolant filter is connected with the engine prior to the engine being tested on a dynamometer. The coolant filter is not used during engine testing in order preserve the full amount of chemical treatment impregnated within the filter cartridge. Therefore, a valving system must be provided to isolate the engine pressurized coolant from the filter cartridge. A valving system is also required if it is desirable to test the engine before installation of the filter cartridge.

It is also desirable to isolate the filter from the remainder of the coolant system when changing the filter. If a valving system is not provided to isolate the filter, then the coolant must be drained or it would leak from the header when the coolant filter is removed.

Prior to the present invention isolating the coolant filter required placing valves on the inlet and outlet coolant lines leading to the filter header. One prior arrangement requires extensive routing of the coolant inlet and outlet lines and is highly undesirable in the environment of a truck since space under the hood is at a premium. Another prior arrangement utilizing a spool valve in the header is also undesirable since it requires a highly precision machined valve spool and housing and does not seal leak free due to necessary clearances between the valve spool and housing. Problems with such valves often prevented the valves from functioning properly under the coolant system pressure.

SUMMARY OF THE INVENTION

To overcome the disadvantages of prior engine coolant filter and coolant treatment systems the following invention is brought forth. The present invention comprises a coolant filter system with a header which is sealably connected with the container which surrounds the filtering-treatment cartridge. Within the header is a novel valve arrangement with a pair of valving elements which utilize deformable sleeves and a common valve spool to allow the filter-treatment cartridge to be isolated from the remainder of the coolant system by simple rotation of the valve spool.

The deformable sleeves provide increase sealing capacity while at the same time eliminating the requirement of repacking (required in the use of some ordinary valves). The deformable sleeves also resist the loss of elasticity. The inventive header valve element does not require the precision machining of prior coolant filter valves.

An embodiment of the inventive coolant filter-treatment system is utilized in an arrangement with a heat exchanger, typically the oil cooler. The header is attached to the oil cooler for support. This inventive arrangement leads to increase functional reliability while at the same time leading to mechanical simplicity by eliminating the prior coolant inlet and outlet lines and the two prior isolation valves. Therefore, the inventive arrangement conserves vital space in the engine compartment.

The present invention is also advantageous in that it provides for a greater differential pressure across the filter element. Prior to the present invention the tube leading from the filter outlet connected with the engine cylinder head outlet. With the present invention the filter outlet leads directly into the oil cooler outlet via the header. The oil cooler outlet leads into the water pump inlet and is at a lower pressure than the cylinder head outlet. Therefore, the differential pressure across the filter is increased.

It is an object of the present invention is to provide a coolant filter-treatment pressure vessel which can be isolated from the remainder of the coolant system providing a leakfree environment for the removal of the filter cartridge. It is an object of the present invention to provide a valving mechanism which would isolate the coolant filter from the remainder of the coolant system by the simple rotation of one valve lever. It is further an object of the present invention to provide a coolant fiter-treatment pressure vessel along with a heat exchanger which can be utilized in a smaller space than previously available. It is the desire of the present invention to provide a coolant filter valve with increased sealing capacity.

It is still another desire of the present invention to provide a coolant-filter which is simpler to manufacture.

Other objects and advantages of the present invention will become apparent to those skilled in the art as the nature of the invention is better understood from the accompanying drawings and detailed description.

BRIEF DESCRIPTION OF THE DRAWINGS

FIG. 1 is a perspective assembly view of an embodiment of the present invention;

FIG. 2 is a partial sectional view of the header illustrated in FIG. 1;

FIG. 3 is an assembly drawing illustrating the placement of the valve spool into the header;

FIGS. 4 and 5 are cross-sectional views of the spool valve installed within the header illustrating the valve spool respectively in open and closed positions.

DETAIL DESCRIPTION OF THE DRAWINGS

Referring to FIG. 1, the coolant filter-treatment pressure vessel system 10 has three major elements. The first element is the header 12. To the left of the header 12 is a heat exchanger 14 which is provided as the oil cooler. Below the header 12 is a threadably connected cartridge type filter and chemical treatment element 16. The header also provides a pressure boundary for the filter providing a sealed connection.

The oil cooler 14 provides a means of support for the header 12 and attached cartridge 16. The oil cooler 14 has a high pressure coolant inlet 22 and a low pressure coolant outlet 24 connected with the respective high and low pressure communicative passages 26 and 28 of the header. Tubes (not shown) connect the high pressure passage 26 and low pressure passage 28 respectively with the engine coolant pump outlet and inlet. The oil cooler 14 also has an oil inlet and an oil outlet respectively incorporated in mounting pads 18 and 20 to allow the exchange of thermal energy of the oil with the engine coolant.

The filter 16 is a cartridge type, wherein the cartridge container wall 30 is fixably connected with the internal filter media and provides the pressure boundary for the filter. Filter 16 has an internally threaded portion 32 which is threadably connected to the header stud 34, as shown in FIG. 2.

Header 12 has five major passages machined or cast therein. Communicative low pressure passage 28 allows coolant to flow away from the oil cooler and communicative high pressure passage 26 is provided to allow flow to the oil cooler. A filter (container or cartridge) inlet passage 38 fluidly connects with the high pressure passage 26 and a filter outlet passage 36 fluidly connects with low pressure passage 28. Intersecting filter inlet 38 and outlet 36 is a spool bore 40.

Referring to FIGS. 2 and 3, rotatably mounted within spool bore 40 is the valve spool 42. The valve spool has two axially separated, parallel diametral passages 44 and 46 therethrough which are positionally aligned with the filter inlet passage 38 and outlet passage 36 respectively. By using dowel pin 48, the valve spool 42 can be rotated into a position to allow flow into and out of the filter cartrige, or in the alternative prevent the passage of fluid.

For sealing, there is provided in the passages of header 12 adjacent to spool 42, for both the filter inlet passage 44 and outlet passage 46, deformable, typically elastomeric, sleeve elements 50 and 52 respectively having center apertures axially aligned with the header passages. These are preferably installed in an enlarged portion of the header passages 36 and 38 above their intersection with bore 40.

Although not required for the particular application shown wherein a little leakage would not be significant, additional seal elements 54 and 56 can be provided in the passages 36 and 38 on the opposite side of spool 42. Seal elements 54 and 56 are retained in position by snap rings 58 which fit within internal grooves 60 in passages 36 and 38. End cap 62 and O-ring 63 provide sealing axially along the spool 42.

Referring to FIGS. 3, 4, 5, the valve spool 42 has a generally cylindrical shape with two parallel opposed flats 64 and 66 disposed perpendicular to and intersecting the diametral passages 44 and 46 in the spool. When the spool passages 44 and 46 are aligned with their respective header inlet and outlet passages 38 and 36, as in the normal valve-open operating condition shown in FIG. 4, the deformable sleeves are preloaded sufficiently to seal the high pressure in header passage 38 from the low pressure in header passage 36 as well as from the exterior of the valve. When the spool 42 is rotated to the closed position shown in FIG. 5, the deformable sleeves will be further deformed by the camming action of the valve spool as the radial portions 68 and 70 thereof engage the deformable sleeves. When the engine is manufactured and run-in with the cartridge 16 temporarily isolated, the additional load on the sleeves 50, 52, 54, and 56 caused by the camming action will not cause a permanent set in the sleeves. However, as the engine is run for many hours with the valve in its normally open position shown in FIG. 4, the deformable sleeves may take a permanent set. The camming action caused by rotating the valve spool 42 will then provide additional load on the sleeves when the cartridge 16 is removed for servicing so that no leakage occurs. Thus, although this additional loading on the sleeves could be used, in other applications of the valve, to provide additional sealing load with the valve closed, its purpose here is to provide for long term set in the sleeves 50, 52, 54, 56. If it were used in such other applications for additional sealing loads in some conditions, the spool passges 44 and 46 could optionally intersect the radial portions 68 and 70 of the spool to produce higher sealing loads when the valve is open. Additionally, due to the deformable nature of the sleeves 50, 52, 54, and 56, precise tolerances in the dimensions of the spool bore 40 and spool 42 are unnecessary.

Referring back to FIG. 1, typically the oil cooler 14 will be permanently affixed to the motor engine and provide support for the header 12 and cartridge filter 16. Thus, the external inlet line and valve between the header 12 and oil cooler 14 is eliminated. The external outlet line from the header 12 to the engine cylinder block outlet and the valve between the header and the engine cylinder block outlet is also eliminated. The header 12 can now be isolated by simply rotating valve spool 42 instead of the multiple valves required by some prior arrangements. If desired the header 12 can be configured to serve as a pressure boundary for the oil cooler 14 also conserving space which may be critical in the vehicle engine compartment environment.

Although a few embodiments of the present invention have been explained, it will become apparent to those skilled in the art of the various modifications which can be made to the present invention without departing from the spirit or scope of this invention as encompassed by the following claims.

What is claimed is:

1. For an internal combustion engine, a cooling fluid treatment and lubricating oil heat exchanger pressure vessel arrangement with a removable fluid treatment cartridge comprising:

a header having primary cooling fluid high and low pressure communicative passages, a cartridge inlet fluidly connected with said high pressure passage, a cartridge outlet fluidly connected with said low pressure passage, and a linear passage intersecting said cartridge inlet and outlet;

a lubricating-oil-to-coolant exchanger connected with said header having a high pressure coolant inlet connected with said primary high pressure passage of said header and a coolant outlet fluidly connected with said low pressure passage of said header, and said heat exchanger having a lubricating oil inlet and a lubricating oil outlet;

a rotatable valve spool inserted within said linear bore of said header having a pair of axially separated traversing apertures positionally aligned with said cooling fluid inlet and outlet;

deformable sleeves axially aligned with and inserted within said cooling fluid treatment inlet and outlet, said deformable sleeves being separated by said valve spool; and a cooling fluid treatment container sealably connected with said header surrounding said cartridge.

* * * * *